(12) United States Patent
Yatabe et al.

(10) Patent No.: US 8,254,702 B2
(45) Date of Patent: Aug. 28, 2012

(54) IMAGE COMPRESSION METHOD AND IMAGE PROCESSING APPARATUS

(75) Inventors: Yusuke Yatabe, Yokohama (JP); Hirotomo Sai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1094 days.

(21) Appl. No.: 12/059,005

(22) Filed: Mar. 31, 2008

(65) Prior Publication Data
US 2009/0028447 A1 Jan. 29, 2009

(30) Foreign Application Priority Data
Jul. 26, 2007 (JP) .................. 2007-194606

(51) Int. Cl.
*G06K 9/36* (2006.01)
(52) U.S. Cl. .................................................... 382/232
(58) Field of Classification Search .......... 382/232, 382/236, 238–240, 248, 250; 341/50–51; 375/240.02–240.03, 240.1, 240.11, 240.13, 375/240.16, 240.18, 240.2, 240.24, 240.12; 348/390.1, 404.1, 407.1, 416.1, 420.1, 424.1, 348/430.1, 431.1, 394.1; 715/723–726, 799; 725/38
See application file for complete search history.

(56) References Cited

U.S. PATENT DOCUMENTS

| | | | | |
|---|---|---|---|---|
| 5,107,345 A | * | 4/1992 | Lee ................................ | 382/250 |
| 5,144,424 A | * | 9/1992 | Savatier .................... | 375/240.03 |
| 5,793,892 A | * | 8/1998 | Pan et al. ...................... | 382/232 |
| 5,838,833 A | | 11/1998 | Ishikawa et al. | |
| 6,292,589 B1 | * | 9/2001 | Chow et al. .................... | 382/239 |
| 6,721,952 B1 | * | 4/2004 | Guedalia et al. ................. | 725/38 |
| 6,853,318 B1 | * | 2/2005 | Rabbani et al. ................. | 341/50 |
| 7,035,453 B2 | * | 4/2006 | Liu ................................ | 382/154 |
| 7,039,241 B1 | * | 5/2006 | Van Hook ..................... | 382/232 |
| 8,019,167 B2 | * | 9/2011 | Dvir et al. ..................... | 382/232 |

FOREIGN PATENT DOCUMENTS

| | | |
|---|---|---|
| JP | 9-18877 | 1/1997 |
| JP | 2003-264834 | 9/2003 |
| JP | 2006-311347 | 11/2006 |

* cited by examiner

*Primary Examiner* — Jose Couso
(74) *Attorney, Agent, or Firm* — Antonelli, Terry, Stout & Kraus, LLP.

(57) ABSTRACT

When a motion image is to be compressed, the present invention divides a high-resolution still image into image segments to perform a motion image encoding process on each image segment. In this instance, the importance of each image segment and the relativity of each image segment with another image segment are computed. The image segments are then aligned in the order of importance to determine a picture type for motion image encoding in accordance with the computed relativity. Encoding is performed in accordance with a determined encoding sequence and picture type. Further, the rate control bit allocation amount for motion image encoding is increased for highly important image segments. Therefore, the present invention makes it possible to exhibit a high overall image compression efficiency while avoiding image quality deterioration in an important portion of a still image by using a motion image compression technology for still image compression.

8 Claims, 8 Drawing Sheets

| IMAGE SEGMENT | $S_1$ | $S_2$ | $S_3$ | $S_4$ | $S_5$ | $S_6$ | $S_7$ | $S_8$ | $S_9$ |
|---|---|---|---|---|---|---|---|---|---|
| IMPORTANCE | 3 | 5 | 4 | 2 | 1 | 2 | 5 | 6 | 6 |

FIG. 9
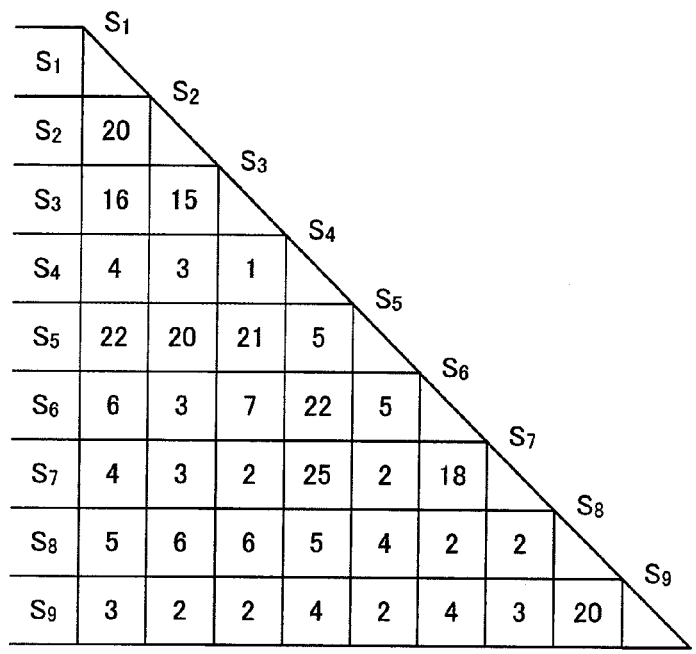
FIG. 10A
IMAGE SEGMENTS (IN ORDER OF IMPORTANCE)    $S_5$    $S_4$    $S_6$    $S_1$    $S_3$    $S_2$    $S_7$    $S_8$    $S_9$
FIG. 10B
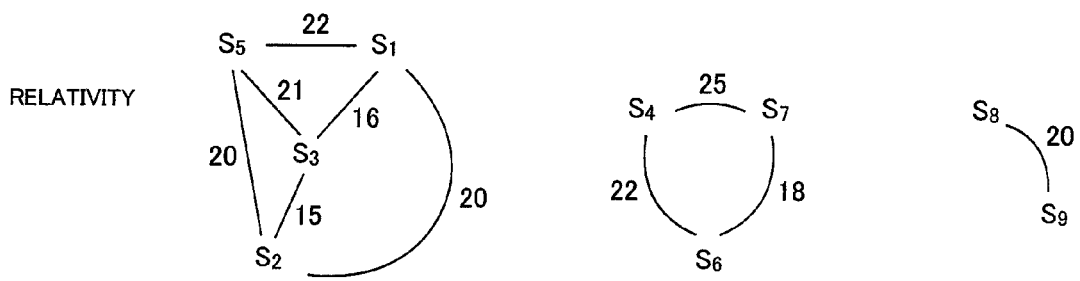

IMAGE COMPRESSION METHOD AND IMAGE PROCESSING APPARATUS

CLAIMS OF PRIORITY

The present application claims priority from Japanese application serial no. JP2007-194606, filed on Jul. 26, 2007, the content of which is hereby incorporated by reference into this application.

BACKGROUND OF THE INVENTION

The present invention relates to an image compression method and an image processing apparatus. More specifically, the present invention relates to an image compression method and an image processing apparatus that are suitable for compressing still image data of a camera, recorder, or other digital device capable of recording/reproducing both still images and motion images.

An image pickup processing apparatus disclosed in JP-A-2006-311347 can process a motion image and a still image in parallel without lowering the motion image frame rate when capturing a still image during motion image recording.

When a motion image and a still image are to be encoded in a motion image/still image camera, a technology disclosed in JP-A-2003-264834 performs encoding while the number of tiles into which the motion image is divided differs from the number of tiles into which the still image is divided.

In recent years, video cameras and other similar apparatuses capable of recording both motion images and still images have been widely used. The still images have increased resolution so that their sizes are larger than image sizes provided by motion image compression. These video cameras need to incorporate a motion image encoder and a still image encoder. However, motion image encoders do not generally support high-resolution still image sizes.

Meanwhile, the H.264 technology has attracted attention as a compression technology for motion image encoding. This technology offers approximately three times the degree of compression provided by a former motion image encoding technology, and will become a future standard for video cameras. For still images, however, the JPEG (Joint Photographic Experts Group) technology is still widely used. The JPEG technology is inferior to the motion image compression technology in image compression capability.

A method disclosed under the above circumstances compresses a still image after dividing it into segments in a situation where the employed encoder has a low image compression capability. For example, a method disclosed in JP-A-2006-311347 encodes a motion image as a Motion JPEG image with reference to the VGA size, and divides a still image as appropriate and compresses the resulting image segments as JPEG images (see paragraphs 0123 to 0125).

As shown in FIG. 12, a method disclosed in JP-A-2003-264834 reduces the number of tiles into which a motion image is divided, and reduces the number of tiles into which a still image is divided. This makes it possible to process the still image without sacrificing image quality (see paragraph 0057) and transmit the motion image at high speed for enhanced motion smoothness (see paragraph 0058).

It is demanded that a video camera capable of handling both still images and motion images should not incorporate both a motion image encoder and a still image encoder because the apparatus will have a complex configuration and become costly. Further, when the image format of compressed motion images differs from that of compressed still images, complicated file management needs to be exercised within the apparatus.

As such being the case, it is preferred that only one type of encoder be used. When, for instance, the H.264 encoding, MPEG, or other motion image compression standard is to be employed, technologies for dividing a still image and subjecting the resulting image segments to motion image compression may be used as described in JP-A-2006-311347 and JP-A-2003-264834.

However, the above-mentioned encoding technologies for motion image compression do not support a method of encoding still images and compressing them with high efficiency. The above-mentioned encoding technologies for motion image compression support a viewpoint of inter-frame time prediction and define different picture types (I picture, P picture, and B picture) for individual frames to increase the compression ratio. However, a viewpoint of time is not supported for still image compression. The above-mentioned conventional technologies are not developed to increase the overall image compression ratio while avoiding image quality deterioration in an important portion of a still image.

The present invention has been made to solve the above problem. An object of the present invention is to provide an image compression method that exhibits a high overall image compression efficiency while avoiding image quality deterioration in an important portion of a still image by using a motion image compression technology for still image compression in an apparatus capable of handling both motion images and still images.

SUMMARY OF THE INVENTION

The image compression method according to the present invention divides a high-resolution still image to create image segments, and compresses the individual image segments through the use of a motion image encoding scheme.

In the above instance, the image compression method according to the present invention computes the importance of each image segment. It is assumed that an image segment positioned at the center of an image frame is very important.

Further, the image compression method according to the present invention determines the relativity of each image segment with another image segment. The relativity can be determined by comparing, for example, the variance values of individual image segments and the difference between them.

The image compression method according to the present invention then aligns the image segments in the order of importance, and determines their picture type (I picture, P picture, or B picture) for motion image encoding in accordance with the relativity. The rate control bit allocation amount for motion image encoding increases with an increase in the degree of image segment importance.

An alternative would be to group the image segments by relativity, define the reference relationship within a group, and determine the picture type.

BRIEF DESCRIPTION OF THE DRAWINGS

FIG. 9 shows an example that indicates the relativity between individual image segments according to a second embodiment of the present invention.

FIG. 10A shows an example that indicates the importance of each image segment according to the second embodiment of the present invention. FIG. 10B shows an example that indicates the relativity between individual image segments according to the second embodiment of the present invention.

DESCRIPTION OF THE PREFERRED EMBODIMENTS

Embodiments of the present invention will now be described with reference to FIGS. 1 to 12.

First Embodiment

A first embodiment of the present invention will be described below with reference to FIGS. 1 to 7.

First of all, the configuration of a typical image processing apparatus that compresses images in accordance with the first embodiment of the present invention will be described with reference to FIG. 1.

Figure 1:
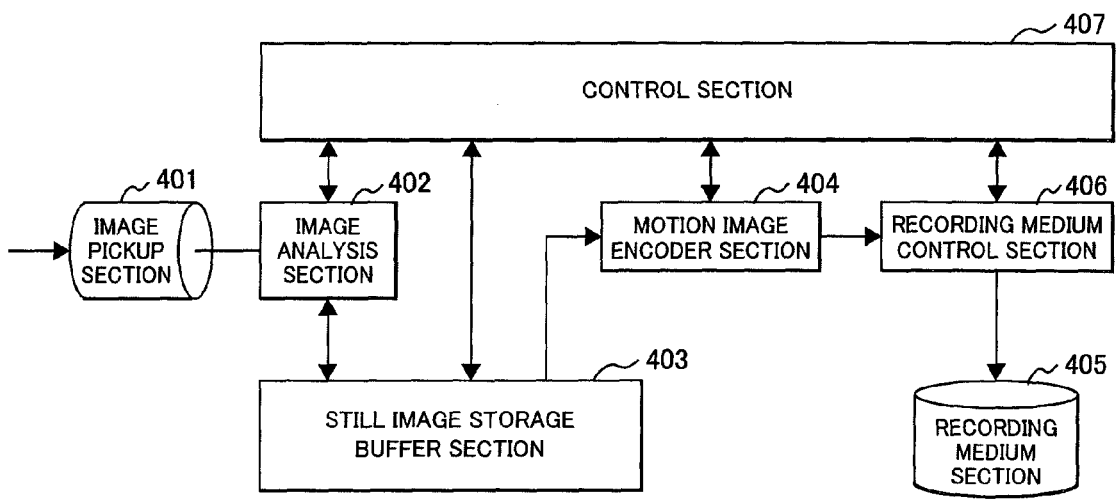
FIG. 1 shows the configuration of a video camera that compresses images in accordance with a first embodiment of the present invention.

FIG. 1 shows the configuration of a video camera that compresses images in accordance with the first embodiment of the present invention.

As shown in FIG. 1, the video camera that compresses images in accordance with the first embodiment of the present invention includes an image pickup section 401, an image analysis section 402, a still image buffer section 403, a motion image encoding section 404, a recording medium section 405, a recording medium control section 406, and a control section 407.

The image pickup section 401 is capable of picking up both still images and motion images. Especially, this section 401 can acquire high-resolution still images.

The image analysis section 402 analyzes a high-resolution still image that is acquired by the image pickup section.

The still image buffer section 403 is a storage area that temporarily stores a high-resolution still image.

The motion image encoding section 404 performs a motion image encoding process on individual image segments into which a still image is divided as described later.

The recording medium section 405 is a storage area that records a motion image stream. This section is implemented by a memory card, a hard disk drive (HDD), or an optical disc such as a DVD.

The recording medium control section 406 controls the recording medium section 405.

The control section 407 controls the motion image encoding section 404 and recording medium control section 405 in accordance with analysis results fed from the image analysis section 402.

Although an image compression process according to the present embodiment will be described in detail later, the video camera performs its process as described below.

The image analysis section 402 divides a high-resolution still image acquired from the image pickup section 401 and makes analyses to determine the importance of each image segment and the relativity between individual image segments.

The control section 407 reads the analysis results from the image analysis section 402, performs rearrangement in image segment encoding sequence, determines a picture type, and determines a rate control bit allocation amount.

The control section 407 then sets the resulting information in the motion image encoding section 404. The motion image encoding section 404 performs an encoding process in accordance with the information, and then stores the resulting recording stream in the recording medium section 405.

The above description assumes that a video camera is used as the image processing apparatus. However, an image compression method according to the present embodiment can also be applied to the other apparatuses capable of handling both still images and motion images, such as a digital television receiver and a digital still camera having a motion image encoder.

Alternatively, image compression may be performed by allowing, for instance, a CPU in a personal computer without any dedicated hardware to execute an image compression program.

Next, a process performed after the image compression method according to the first embodiment of the present invention will be described with reference to FIGS. 2 to 8.

Figure 2:
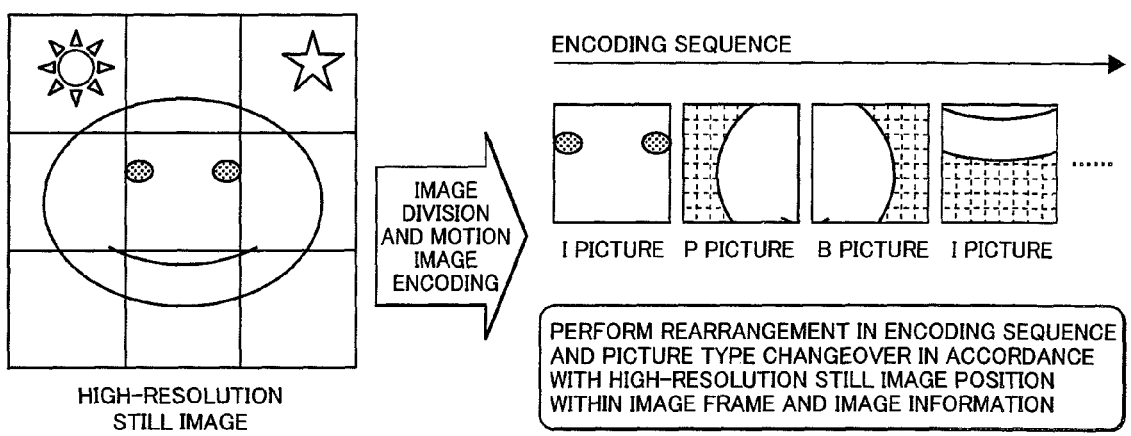
FIG. 2 is a set of conceptual diagrams illustrating an image compression method according to the first embodiment of the present invention.

FIG. 2 is a set of conceptual diagrams illustrating the image compression method according to the first embodiment of the present invention.

Figure 3:
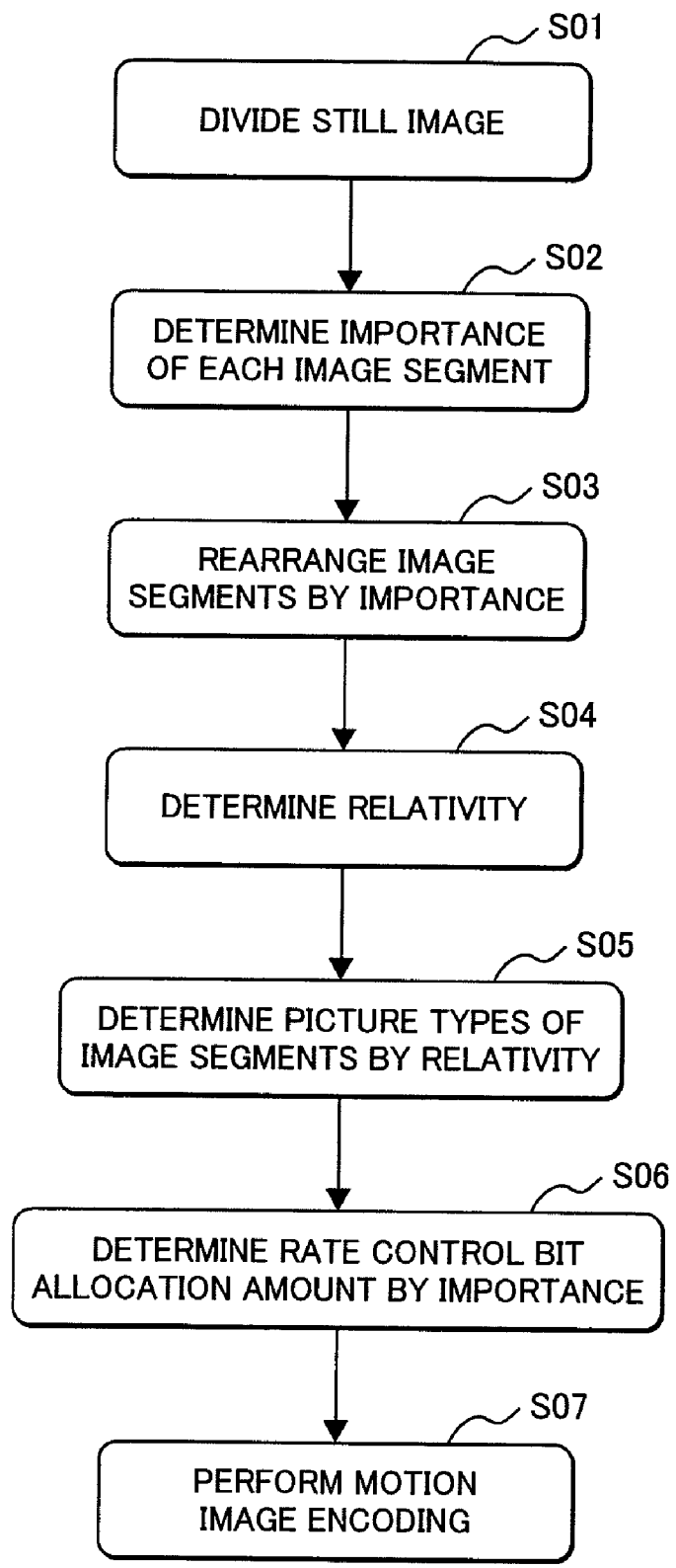
FIG. 3 is a flowchart illustrating a process that is performed after the image compression method according to the first embodiment of the present invention.

FIG. 3 is a flowchart illustrating a process that is performed after the image compression method according to the first embodiment of the present invention.

Figures 4, 5:
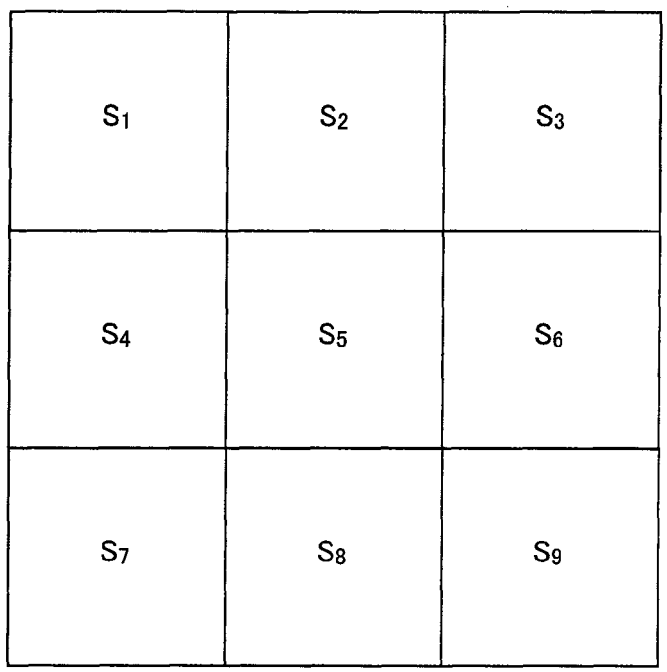
FIG. 4 shows nine image segments into which an image is divided.
FIG. 5 shows an example that indicates the importance of each image segment according to the first embodiment of the present invention.

FIG. 4 shows nine image segments into which an image is divided.

FIG. 5 shows an example that indicates the importance of each image segment according to the first embodiment of the present invention.

Figure 6:
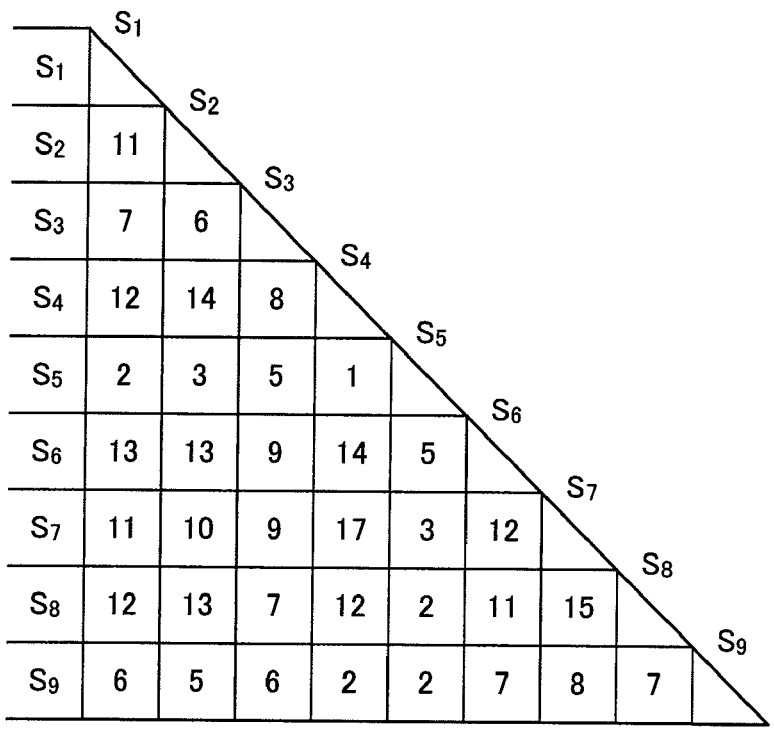
FIG. 6 shows an example that indicates the relativity between individual image segments according to the first embodiment of the present invention.

FIG. 6 shows an example that indicates the relativity between individual image segments according to the first embodiment of the present invention.

Figure 7:
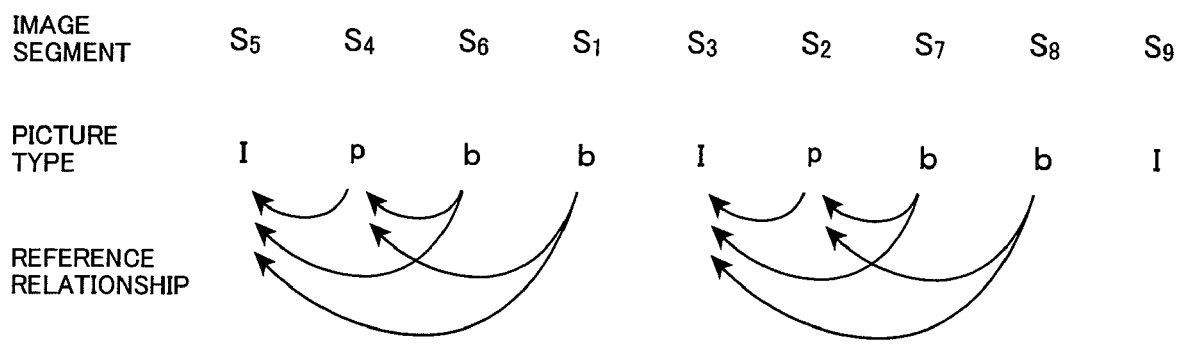
FIG. 7 illustrates the determination of an image segment alignment sequence and picture type according to the first embodiment of the present invention.

FIG. 7 illustrates the determination of an image segment alignment sequence and picture type according to the first embodiment of the present invention.

Figure 8:
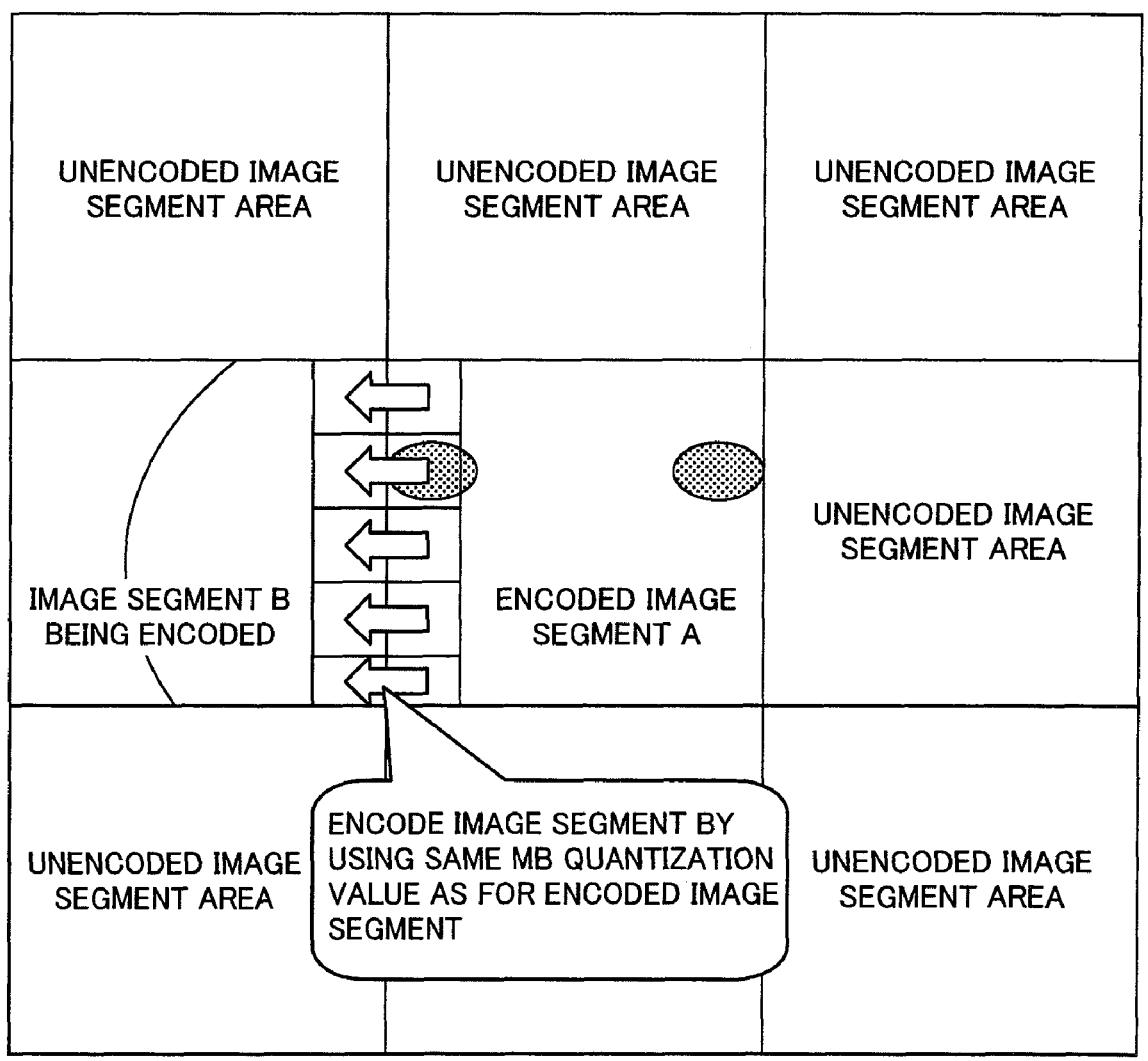
FIG. 8 illustrates the determination of a quantization value.

FIG. 8 illustrates the determination of a quantization value.

The following description assumes that a high-resolution still image is divided into nine image segments as shown in FIG. 2 to encode them with a motion image encoder. The following description also assumes that the still image is divided into rectangular areas of the same size and encoded with an H.264 motion image encoder.

The processing steps performed after the image compression method according to the present embodiment will now be described with reference to the flowchart in FIG. 3.

The present embodiment assumes that a still image is to be divided into nine image segments. A concrete example will be used to describe the present embodiment with the nine image segments named as indicated in FIG. 4.

First of all, step S01 is performed to divide a still image that is to be compressed. Next, step S02 is performed to determine the importance of each image segment.

The importance is an index for achieving high-quality image compression. For example, the picture type is determined so that an image segment having high importance is classified as an I picture. Further, a large bit allocation amount is applied to an image segment having high importance at the time of rate control.

One or a combination of some of the following rules are applied to determine the importance:

(I1) To raise the importance of an image segment at the center of an image frame (I2) To locate a person in a still image by means of image recognition and raise the importance of such a portion (I3) To provide the user with a tool for specifying the importance and raise the importance of a user-designated area (I4) To make a motion analysis of a still image successively and raise the importance of image segments showing a motion Rule (I1) is formulated on the assumption that the user pays attention to the center of an image frame. Rule (I4) is formulated to raise the importance of a portion in which a moving person is visible in a situation where a surveillance camera is used for human movement monitoring. Even when a digital still camera is used, the user may be allowed to select a motion image pickup mode and raise the importance of a moving subject.

For example, it is now assumed that the importance of each image segment shown in FIG. 4 is as indicated in FIG. 5. The example shown in FIG. 5 assumes that the smaller the numerical value, the higher the importance.

After completion of importance determination, step S02 is performed to rearrange the image segments in the order of decreasing importance.

When the image segments shown in FIG. 4 are rearranged as described above, the resulting image segment sequence is as shown in FIG. 7; that is, from left to right, the rearranged image segments are $S_5$, $S_4$, $S_6$, $S_1$, $S_3$, $S_2$, $S_7$, $S_8$, and $S_9$.

Next, step S04 is performed to determine the relativity of each image segment with another image segment for the purpose of picture type determination.

One or a combination of some of the following rules are applied to determine the relativity:

(R1) To calculate the variance values of individual image segment data (brightness values and color difference values) and locate a high relativity between image segments having similar variance values (R2) To calculate the difference between individual image segment data and locate a high relativity between image segments involving a small difference value (R3) To map a DCT (Discrete Cosine Transformation) value of each encoding target block within an image segment and locate a high relativity between image segments having similar mapped frequency conversion coefficients It is now assumed that the relativity between image segments shown in FIG. 4 is obtained when an evaluation is made in accordance with rules (R1) to (R3).

It is also assumed that the smaller the numerical value, the lower the relativity shown in FIG. 6. When the sum of relativity values of other image segments is determined, a relativity decrease is indicated by the value 23 of $S_5$, the value 48 of $S_9$, and the value 57 of $S_3$.

Next, step S05 is performed to determine the picture types for encoding of the image segments, which are arranged in the order of importance in step S03, in accordance with the above relativity.

The picture type for use in encoding is determined in accordance, for instance, with the following rules:

(P1) To classify an image segment as an I picture when it exhibits a low relativity with any other image segments (P2) When there is a high relativity with other image segments, the second image segment as counted from the I picture classified according to rule (P1) is classified as a P picture, and the third and subsequent image segments are classified as B pictures. In such an instance, the motion compensation reference picture for the P picture is the leading I picture, and the motion compensation reference pictures for the B pictures are the leading I picture and the immediately preceding P picture.

In the above example, the relativities of image segments $S_5$, $S_9$, and $S_3$ with the other image segments are low as shown in FIG. 6. Therefore, image segments $S_5$, $S_9$, and $S_3$ are classified as I pictures in accordance with rule (P1), and subsequent image segments are classified as P and B pictures in accordance with rule (P2). The motion compensation reference picture for image segment $S_4$ is image segment $S_5$, and the motion compensation reference pictures for image segments $S_6$ and $S_1$ are image segments $S_5$ and $S_4$.

The reference relationship between subsequent image segments $S_3$ to $S_8$ is also defined in the same manner.

The picture type is a technology for inter-frame prediction of MPEG or H.264 motion images. The I picture (intra coded picture) is a frame whose image is entirely encoded without inter-frame prediction. The P picture (predictive coded picture) is a frame for which a difference is encoded with inter-frame forward prediction performed. The B picture (bidirectionally predictive coded picture) is a frame for which bidirectionally predicted differences from the past and future are encoded.

It should be noted, however, that the present embodiment divides a still image into image segments; therefore, there is no temporal relationship between individual pictures.

Further, the H.264 technology can freely define the reference frame relationship. Therefore, when the frame reference relationship for P and B pictures is to be determined after picture type determination, image segment pictures may be searched for in such a manner as to increase the relativity with the image and then referenced without regard to the rules established above. In other words, when the P and B pictures have a high relativity with an image segment I picture, the reference relationship for referencing such an I picture can be defined no matter whether it is placed two or three positions forward in terms of importance.

Next, step S06 is performed to determine a rate control bit allocation amount for individual image segment encoding.

At the time of encoding, bit allocation is performed for each picture so that the overall compression data amount of a still image agrees with a desired data amount. In this instance, bit allocation is performed so that the higher the importance of each of the image segments arranged in the order of importance in step S03, the larger the bit allocation amount prevailing at the time of compression. In other words, the higher the importance of an image segment, the larger the bit allocation amount prevailing at the time of compression and thus the smaller the degree of image deterioration.

Next, step S07 is performed to encode each image segment in accordance with the compression-derived bit amount and picture type determined as described above.

When each image segment is to be encoded, a quantization value is adjusted as described below. If upper, lower, left, or right neighboring encoding unit block (macroblock or MB) for the image segment to be encoded is already encoded, the quantization value for use in quantization is adjusted until it is equal or close to the quantization value for such a neighboring MB. The reason is that if the image segments significantly differ in the quantization value, the image quality deterioration of one image segment is obvious when compared with a neighboring image segment. Especially, a significant difference in the quantization value causes block distortion at the boundary between the image segments adjacent to each other.

When equal or similar quantization values are used as described above, it is possible to reduce the distortion at the boundary between the image segments, which might occur when compressed still image information is decompressed and displayed. Further, the quantization values for nonadjacent MBs are controlled so that they do not significantly differ from those for blocks neighboring the abovementioned peripheral image segments. It is necessary that the quantization value for each MB be determined in coordination with a target overall encoding amount.

For example, it is assumed that image segment A, which is at the center, is already encoded as shown in FIG. 8. It is also assumed that image segment B is encoded when the other image segments are still not encoded (unencoded image segment areas).

When image segment B is to be encoded, the value for the right-hand neighboring image segment is already encoded. Therefore, the quantization value for a rightmost MB of image segment B is rendered equal or close to the quantization value for an MB of image segment A, which is already encoded.

Second Embodiment

A second embodiment of the present invention will now be described with reference to FIGS. 9 to 12.

FIG. 9 shows an example that indicates the relativity between individual image segments according to the second embodiment of the present invention.

FIG. 10A shows an example that indicates the importance of each image segment according to the second embodiment of the present invention. FIG. 10B shows an example that indicates the relativity between individual image segments according to the second embodiment of the present invention.

Figure 11:
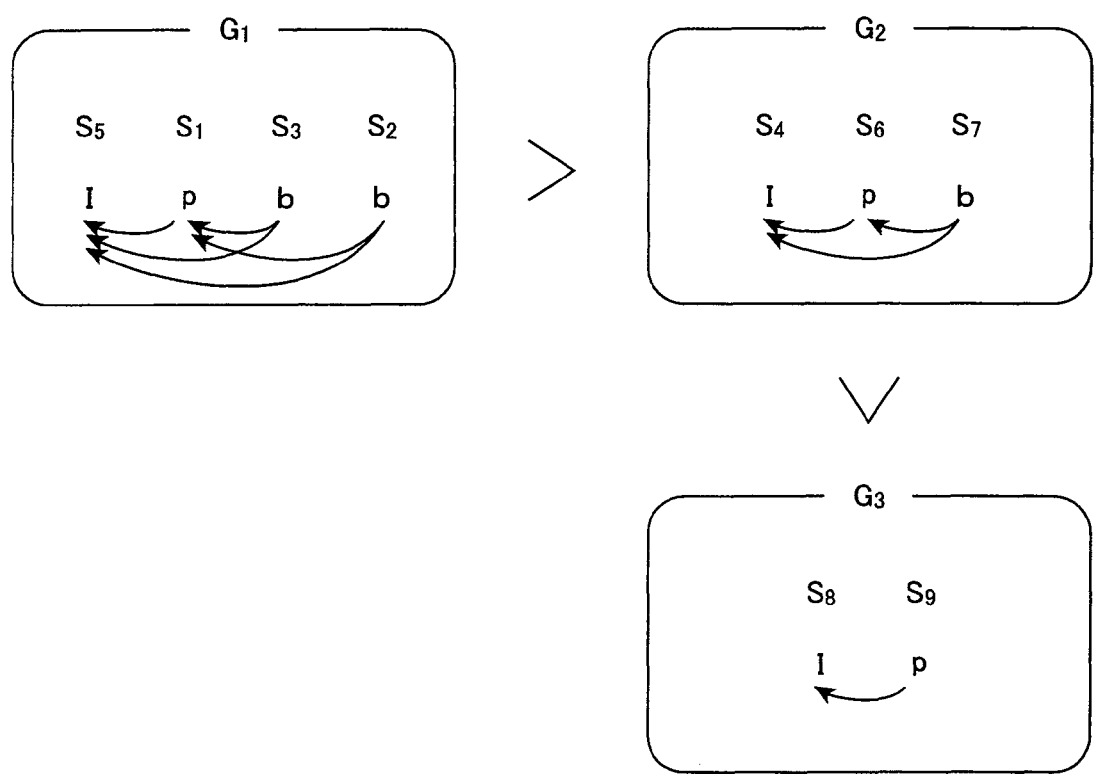
FIG. 11 shows an example that illustrates the determination of an image segment alignment sequence and picture type in accordance with the importance of each image segment in each group.

FIG. 11 shows an example that illustrates the determination of an image segment alignment sequence and picture type in accordance with the importance of each image segment in each group.

Figure 12:
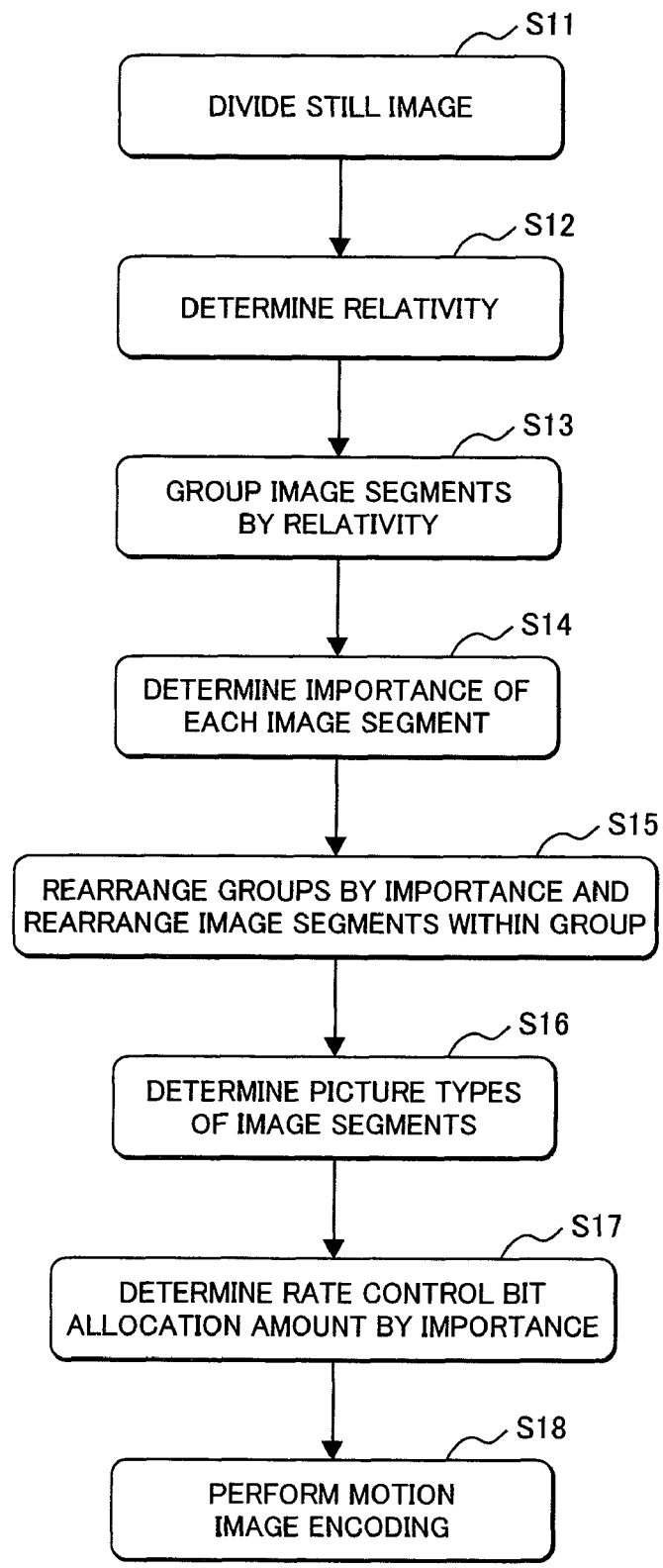
FIG. 12 is a flowchart illustrating a process that is performed after an image compression method according to the second embodiment of the present invention.

FIG. 12 is a flowchart illustrating a process that is performed after an image compression method according to the second embodiment of the present invention.

The first embodiment arranges the image segments by importance, classifies an image segment exhibiting a low relativity as an I picture, classifies the other image segments as a P picture or B picture, and defines the frame reference relationship accordingly. H.264 makes it possible to freely adjust the reference relationship between the P and B pictures. In some cases, therefore, the frame reference relationship for image segments exhibiting a high relativity may be defined beyond pictures arranged in the order of importance.

Meanwhile, the MPEG2 or other similar compression standard predetermines the reference relationship between the P and B pictures. The P picture references the immediately preceding I picture, whereas the B picture references the immediately preceding and following I picture or P picture.

Therefore, when an MPEG2 encoding process is to be performed, the P and B picture might reference a frame exhibiting a relatively low relativity depending on the image segment arrangement in the order of importance.

The second embodiment solves the above problem by introducing a concept named "group," which is based on the relativity between individual image segments, and determining a picture type within a group. Therefore, the present embodiment provides an effective method that is used when an encoding process is performed in compliance with the MPEG2 or other similar motion image compression standard. It should be noted, however, that the compression method according to the present embodiment can also be used when an H.264 encoding process is performed.

It is assumed that the present embodiment also uses the image segments shown in FIG. 4, which were described in conjunction with the first embodiment. Further, the present embodiment assumes that the importance of each image segment is the same as indicated in FIG. 5, which was described in conjunction with the first embodiment.

First of all, step S11 is performed to divide a still image that is to be compressed.

Next, step S12 is performed to determine the relativity between individual image segments. The method of relativity determination is the same as described in conjunction with the first embodiment.

The present embodiment assumes that the relativity between individual image segments is as shown in FIG. 9.

Next, step S13 is performed to group image segments exhibiting a high relativity.

Image segments exhibiting a particularly high relativity in the present embodiment are as shown in FIG. 10B. As indicated in FIG. 10B, image segments $S_1$, $S_2$, $S_3$, and $S_5$ form a first group, image segments $S_4$, $S_6$, and $S_7$ form a second group, and image segments $S_8$ and $S_9$ form a third group. The relativity with image segments in the other groups is small, that is, not greater than 10.

In accordance with the above analysis results, grouping is performed so that image segments $S_1$, $S_2$, $S_3$, and $S_5$ form the first group $G_1$, and that image segments $S_4$, $S_6$, and $S_7$ form the second group $G_2$, and further that image segments $S_8$ and $S_9$ form the third group $G_3$.

Next, step S14 is performed to determine the importance of each image segment. Step S15 is then performed to rearrange the groups in accordance with the importance of each group and rearrange the image segments in each group in accordance with their importance.

Group importance is determined so that the importance of a group is equal to the highest importance of an image segment in the group. In the current example, the importance of group $G_1$ is equal to the importance of image segment $S_5$; the importance of group $G_2$ is equal to the importance of image segment $S_4$; and the importance of group $G_3$ is equal to the importance of image segment $S_8$. Consequently, the groups are rearranged by group importance. In the order of importance, the rearranged groups are $G_1$, $G_2$, and $G_3$, as shown in FIG. 11.

As shown in FIG. 11, in the order of importance, the image segments within group $G_1$ are $S_5$, $S_1$, $S_3$, and $S_2$; the image segments within group $G_2$ are $S_4$, $S_6$, and $S_7$; and the image segments within group $G_3$ are $S_8$ and $S_9$.

Next, step S16 is performed to determine the picture type for encoding of each rearranged image segment within a group.

As regards picture type determination for encoding, the present embodiment classifies an image segment having the highest importance in a group as an I picture, an image segment having the second highest importance as a P picture, and the subsequent image segments as B pictures.

In the above instance, inter-frame prediction is conducted in compliance with the MPEG2 standard so that a P picture references the leading I picture and that a B picture references the leading I picture and immediately preceding P picture. In this manner, frame referencing can be conducted while the MPEG2 reference relationship is maintained within a group. High compression efficiency can be maintained because the reference relationship is defined within a group containing image segments exhibiting a high relativity.

Next, step S17 is performed to determine a rate control bit allocation amount for individual image segment encoding.

Rate control bit allocation may be performed in accordance with the importance of each image segment as is the case with the first embodiment. An alternative would be to perform rate control bit allocation for image segments in a group in accordance with the importance of the group and the number of image segments in the group.

Finally, step S18 is performed to encode each image segment in accordance with the compression-derived bit amount and picture type determined as described above. Encoding begins with the most important group. Within a group, encoding begins with the most important image segment.

Advantages of the Present Invention that can be Understood from the Embodiments As is obvious from the above description of the embodiments, the present invention provides an image compression method that exhibits a high overall image compression efficiency while avoiding image quality deterioration in an important portion of a still image by using a motion image compression technology for still image compression in an image processing apparatus capable of handling both motion images and still images.

What is claimed is:

1. An image compression method for compressing a still image and a motion image to the same digital data format via an image processing apparatus,
   wherein the image processing apparatus includes an image analysis section, a control section, a motion image encoding section, and a recording medium section;
   wherein the image analysis section divides the still image into image segments and analyzes each image segment to compute image information, and determines the importance of each image segment and the relativity of each image segment with another image segment;
   wherein the control section determines an image segment encoding sequence in accordance with the importance and a picture type of each image segment in a way that the image having the low relativity to any other images in accordance with the relativity is assigned to a picture type having no reference relation in accordance with a motion image encode specification; and
   wherein the motion image encoding section performs a motion image encoding process on each image segment in accordance with the encoding sequence and picture type determined by the control section, makes the encode data of the same digital data format as a motion image, and records the encode data to the recording medium section.

2. The image compression method according to claim 1, wherein the motion image encoding section varies a bit allocation amount for rate control in accordance with the importance, the rate control being exercised when a motion image encoding process is performed on each image segment.

3. The image compression method according to claim 1, wherein the picture type is either I picture, P picture, or B picture in an MPEG Standard.

4. The image compression method according to claim 1, wherein the importance is determined by the position of an image segment, the position of an area where a person is visible within an image segment, a user definition, or the results of motion analysis between a plurality of still images.

5. The image compression method according to claim 1, wherein the relativity is determined by variance values of image segments, difference values between image segments, or the results of frequency conversion coefficient comparison between image segments.

6. The image compression method according to claim 1, wherein, when the motion image encoding section performs a motion image encoding process on each image segment, the quantization value to be used for encoding an encoding target block is equal or close to that for a neighboring encoding target block.

7. The image compression method according to claim 1, wherein the image information includes the importance of each image segment and the relativity of each image segment with another image segment; and wherein the control section classifies image segments exhibiting a high relativity into the same group, determines the importance of a group in accordance with image segments in the group, and determines an encoding sequence for the image segments in the group and a picture type of each image segment in the group.

8. An image processing apparatus that compresses a still image and a motion image to and a motion image to the same digital data format, the image processing apparatus comprising:
   an image analysis section for dividing the still image into image segments and analyzing each image segment to compute image information, and determining the importance of each image segment and the relativity of each image segment with another image segment;
   a control section for determining an image segment encoding sequence in accordance with the importance and a picture type of each image segment in a way that the image having the low relativity to any other images in accordance with the relativity is assigned to a picture type having no reference relation in accordance with a motion image encode specification;
   a recording medium section; and
   a motion image encoding section for performing a motion image encoding process on each image segment in accordance with the encoding sequence and picture type determined by the control section, making the encode data of the same digital data format as a motion image, and recording the encode data to the recording medium section.

* * * * *